July 28, 1925. 1,547,258
J. W. NEWTON
SINGLE TANK COMESTIBLE BRINE FREEZER
Filed Feb. 21, 1923 3 Sheets-Sheet 2
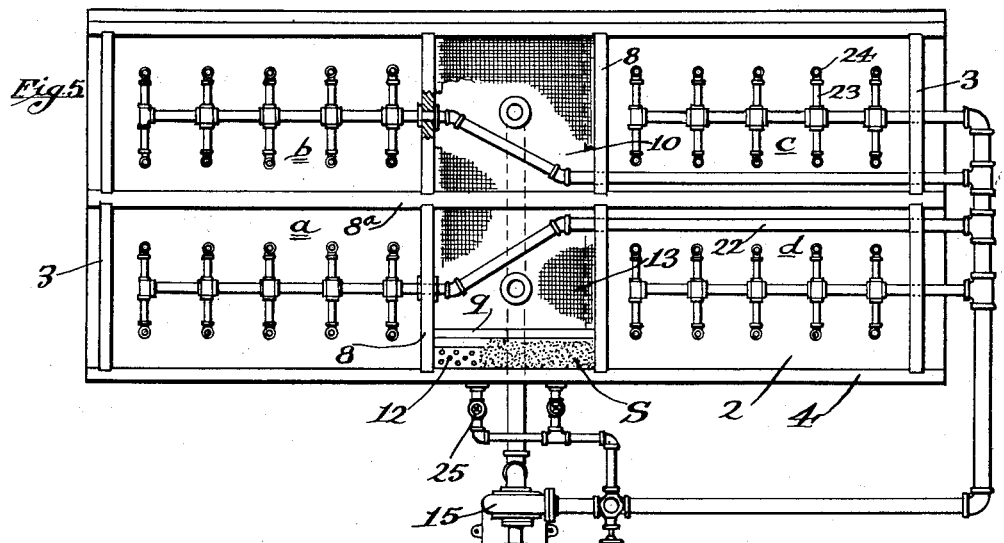
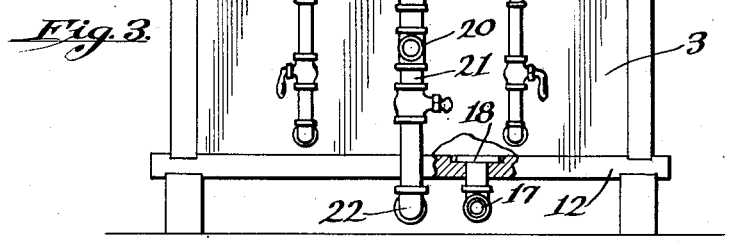
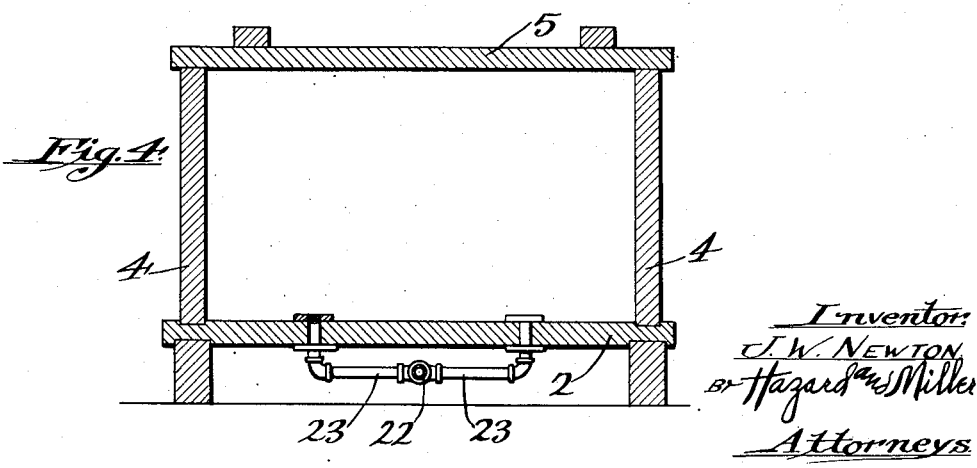

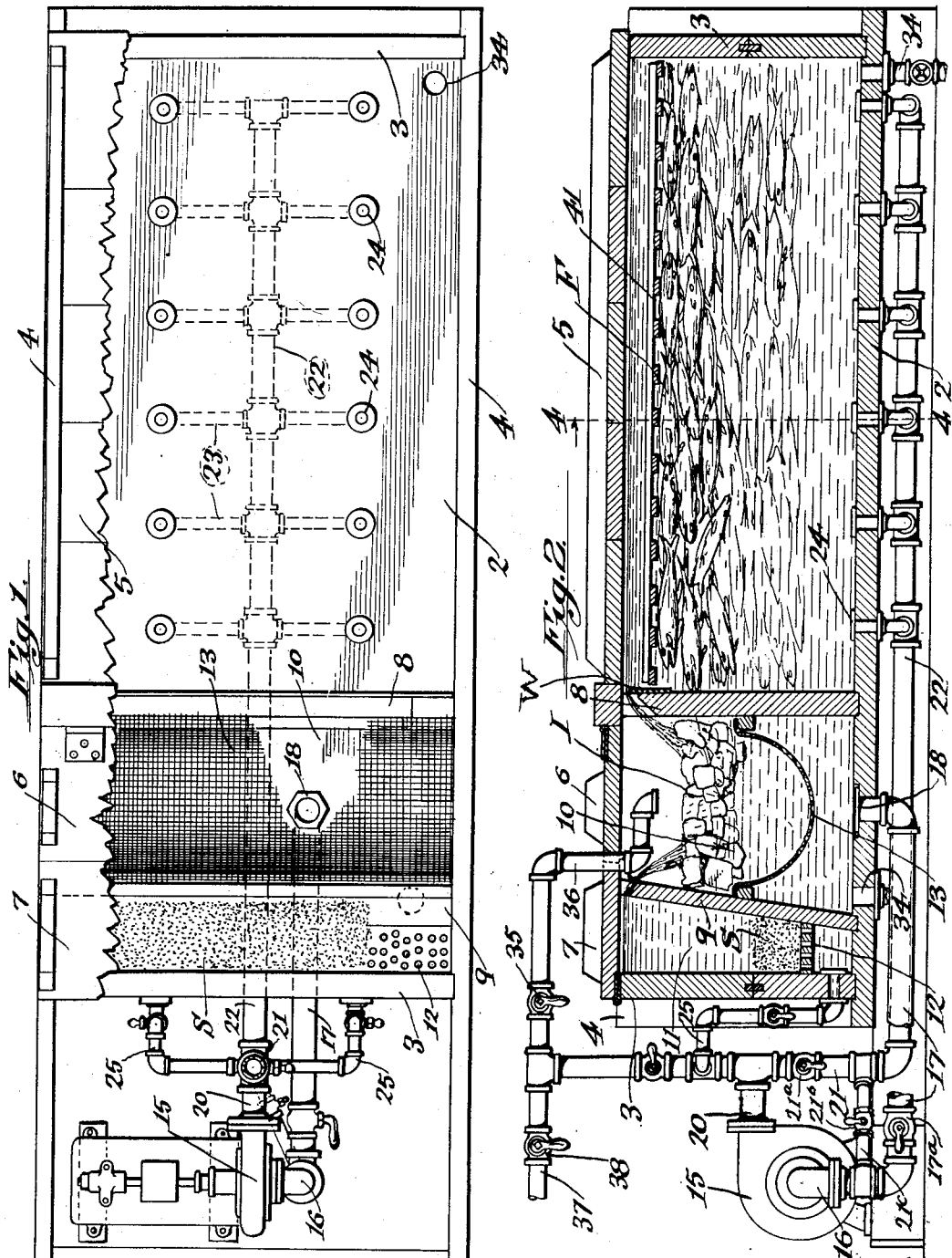

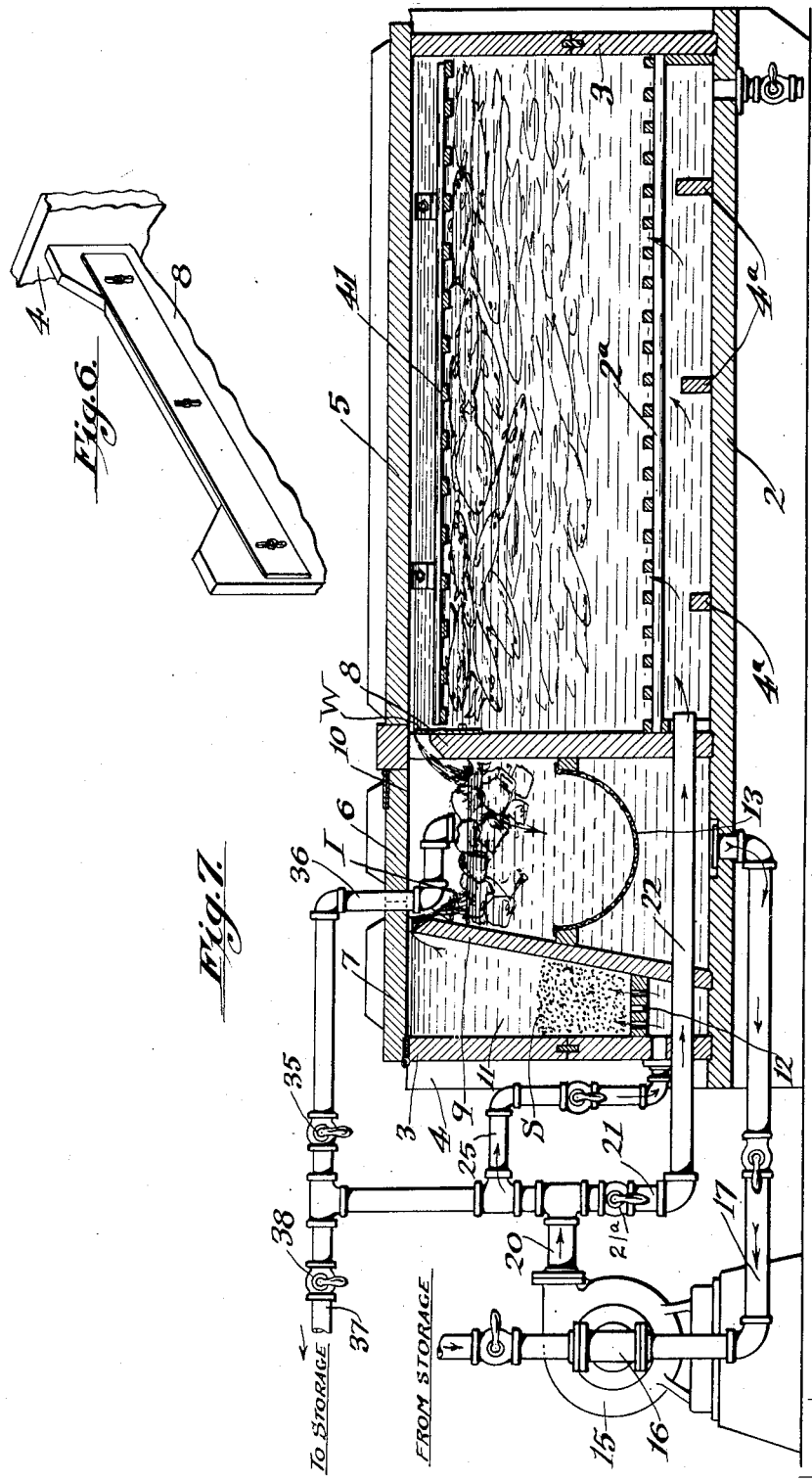

Patented July 28, 1925.

1,547,258

UNITED STATES PATENT OFFICE.

JOHN W. NEWTON, OF LOS ANGELES, CALIFORNIA.

SINGLE-TANK COMESTIBLE BRINE FREEZER.

Application filed February 21, 1923. Serial No. 620,364.

*To all whom it may concern:*

Be it known that I, JOHN W. NEWTON, a citizen of the United States, residing at Los Angeles, in the county of Los Angeles and State of California, have invented new and useful Improvements in Single-Tank Comestible Brine Freezers, of which the following is a specification.

My invention relates to a refrigerating apparatus and a process of freezing comestibles, such as game, fish etc., wherein said comestibles are directly submerged in a liquid refrigerant, consisting of a substantially saturated refrigerating solution, formed by dissolving in a liquid, such as water, a refrigerating material, such as common salt, and adding thereto a cooling medium or refrigerant, such as crushed ice, said liquid refrigerant being continually maintained in a substantially saturated condition and at a temperature close to freezing.

It is an object of my invention to provide a single tank, which is adapted to be closed during the freezing operation, said tank being partitioned off to provide one or more freezing sections, a compartment adapted to house a refrigerating material, such as common salt, a space being provided in said tank or container between said section or sections and said compartment, which space is adapted to house a refrigerating medium, such as crushed ice.

It is also an object of my invention to provide a tank or container in which comestibles are adapted to be bodily submerged, provision being made in said tank or container for forming three solutions of varying specific gravity and temperature, means being also provided whereby said three solutions may be circulated, to commingle the same so as to provide a substantially saturated refrigerating solution or refrigerant in which the bodily submerged comestibles are uniformly frozen individually.

A further object of my invention is to provide a single tank or container comprising one or more freezing sections in which the comestibles are adapted to be directly submerged, means being provided whereby said comestibles may be agitated in all directions by introducing into said section or sections streams of cooled refrigerant removed from that in which the comestibles are submerged.

It is also an object of my invention to place a means, such as a pump, in close proximity with a closed container or tank adapted to house a refrigerant, said pump being adapted to cause said refrigerant to be circulated in said container, the path of circulation being as short and direct as possible, to eliminate loss in efficiency by reason of absorption of heat in the parts in contact with the outer air, the head of said pump being just sufficient to raise the level of said refrigerant in said container to cause said circulation, thereby reducing the cost of producing the apparatus to a minimum.

It is moreover an object of my invention to eliminate the well known form of mechanical agitator, since the provision of such an agitator merely adds to the expense of construction, and moreover, by reason of the necessity of lubricating the same, there is a great danger of contaminating the comestibles to be frozen.

It is also an object of my invention to provide for regulating the circulation of the solutions in my container or stopping the flow altogether.

It is also an object of my invention to provide a means for adjusting the level of the refrigerant in the tank.

It is also an object of my invention to provide a means for removing the refrigerant from the container, after the freezing operation is over, and storing the same, means being also provided whereby the refrigerant may be returned to said container as desired.

It is also an object of my invention to provide means in the bottom of a freezing section whereby the cooled refrigerant, introduced in the bottom thereof, may be diverted upwardly, so that the lower portion of said refrigerant may be subjected to a uniform pressure throughout, whereby the comestibles may be agitated in all directions, so that they may be individually frozen and in a uniform manner.

It is also an object of my invention to provide an apparatus, simple and compact in construction, thoroughly practical and efficient, and inexpensive to construct, and one which does not entail the erection of large, expensive and cumbersome plants, as heretofore has been done, said invention consisting merely of a single tank, partitioned off to form several compartments, a pump, and valved piping for circulating a liquid refrigerant in and between said compartments.

By the use of my invention, fresh comestibles, particularly fish, may be introduced in a refrigerant, without previous washing, so that they will retain their natural, superficial slime, which acts as a protective medium, and in that condition may be frozen solidly and without glazing, since they are frozen in so short a time. When thawed out, the comestibles are in the same condition as when fresh, and hence may be shipped to great distances, the purchaser being unaware that they previously had been frozen, as is not the case with air-frozen fish.

It is distinctly to be understood that the word "brine" as hereinafter used is to include not only an aqueous solution of sodium chloride, but solutions of other soluble salts, such as calcium chloride, magnesium chloride etc.

Other objects and advantages will be made manifest in the following specification of embodiments of the invention illustrated in the accompanying drawings, wherein Figure 1 is a plan of a preferred form of the apparatus the covers of the container being broken away to disclose the interior construction.

Fig. 2 is a vertical longitudinal section.

Fig. 3 is an end elevation of one end of the tank.

Fig. 4 is a vertical cross section on line 4—4 of Fig. 2.

Fig. 5 is a plan showing a tank having a plurality of freezing sections.

Fig. 6 is a persective view of the adjustable discharge weir of the freezing compartment.

Fig. 7 illustrates a form of the apparatus involving a false bottom in the freezing compartment.

To achieve the several important advantages and objects of the present invention the apparatus includes a single tank of suitable dimensions and may be of wood or other material of heat nonconducting properties, and comprises a bottom 2, end walls 3, side walls 4 and, preferably, a top closure which may include a cover 5 and smaller cover parts 6 and 7, the latter for convenience being hinged while the main cover 5 may be entirely removed. The tank or container is provided at any suitable portion with a partition 8 forming at one end of the tank a section of suitable size to receive the objects to be frozen and which, in the present case, are indicated as being fish F.

The partition 8 is shown as extending transversely and terminates short of the top of the tank. Extending across the tank is another partition 9 between which and the partition 8 there is formed what may be called an ice chamber or space 10 into which may be poured, at suitable intervals, crushed ice I, when the lid 6 is lifted. Between the partition 9 and the contiguous end wall 3 there is a compartment or salt box 11 into which may be introduced through the uplifted cover 7 salt S. The bottom of the salt box 11 is provided with a foraminous bottom 12 and there is arranged in the ice chamber 10 a foraminous false bottom 13 which may consist of a piece of semicylindrical screen extending across the tank and which, therefore, serves to prevent downward passage of the ice fragments and other sizeable objects that may enter the ice chamber.

From this it will be seen that the apparatus consists of a single tank having a freezing section, an ice chamber or section, and a salt compartment, all compactly arranged and of inexpensive construction, and all providing for the free circulation of a brine or other freezing liquid without necessitating the flow of the freezing liquid beyond the confines of the tank, except, of course, as may be necessary to accommodate the particular type and arrangement of a circulating means, which, in the present instance, is shown as comprising a simple centrifugal pump 15. The pump has a suction pipe 16 of such a length as to provide said pump with as small a head as possible and connected to a suction conduit 17 which has an intake 18 arranged in the bottom of the ice chamber 10 and preferably below the screen 13. The discharge side of the pump has a connection 20 with, in the present case, a stand pipe 21 from the lower end of which extends a discharge manifold 22, and this manifold may be arranged either within the tank, as shown in Fig. 5, or below the tank, as shown in Figs. 1 to 4 inclusive.

The manifold 22 is provided with a series of lateral branches 23 and these are provided with discharge nozzles 24, the whole constituting a distributor for directly discharging the brine drawn from the ice chamber 10 into the pump and thence returned through the distributor to the bottom of the freezing section of the tank. This causes the refrigerant to be placed in a state of violent agitation, whereby the comestibles may be continually moved about, and thus permitting every part thereof to come in contact with said refrigerant. I have found, by actual practice, that this expedient enables the freezing of, for instance, 1000 lbs. of baracuda each of 5 to 8 lbs., in about one hour and in a brine of about zero F.

The brine rising in the tank freezing section flows over the upper edge of the partition 8 into the ice chamber 10 where it is rechilled after absorbing the latent heat in the fish bodies, and thence flows down through the ice chamber back to the pump 15 which returns it through the distributing means again to the freezing section.

A suitable portion of the brine is discharged from the pump stand pipe 21 by means of a connection 25 into the bottom of the salt box 11 from which the brine flows upwardly through the foraminous false bottom 12 and through the salt and flows over the top edge of the partition 9 into the ice chamber 10.

Due to the comparatively small superficial area of the circulating apparatus that is exposed to the air, as above explained, it will be seen that a minimum loss of efficiency of the apparatus by reason of heat absorption is insured.

It will also be evident that in the matter of power consumption my apparatus is extremely economical, since the circulating pump has an almost unappreciable head to work against, said pump being so positioned that it is not necessary to raise the level of the refrigerant above the brine containing space in the tank.

The apparatus is extremely simple in construction, and the chambers are readily accessible for cleaning, thus providing a sanitary structure because of the arrangement.

A form of the apparatus is shown in Fig. 5 in which, by a tank of comparatively small dimensions, the capacity is greatly increased and at the same time the process may be carried on in one or more brine freezing sections of the tank, all of which are in common communication with the tank chamber as a whole. In this form of the apparatus, therefore, the tank is divided into sections $a$, $b$, $c$ and $d$ formed by the transverse partitions 8 and a longitudinal partition 8ᵂ which, as here arranged, form four corner sections in which freezing may be carried on separately and concurrently, and any one of the sections may be used or may be emptited, cleaned and refilled while the other sections are in operation. As above stated, in this form of the apparatus the manifolds 22 are shown as arranged within the tank and close to the bottom thereof. It is to be understood that the multiple freezing section apparatus may be of various arrangements, and the form shown in Fig. 5 is but an example of but one system.

For the purpose of obtaining an even flow of the brine from the freezing section into the ice compartment or chamber 10, the top of the partition 8 may be provided with an adjustable weir $w$ which can be raised or lowered and adjusted to secure a level of the liquid discharge irrespective of any pitch or inclination that the tank may bodily assume.

It is to be understood that this present method and apparatus may be employed for the freezing of any organic bodies and is especially useful for the freezing of fish, meat, whole animals and game and poultry of various kind.

The bottom of the tank may be provided with various and suitably arranged drain means 34 and the screen 13 is adapted to be lifted bodily from its mounting in the ice chamber 10 so that it may be cleaned, or renewed, or to provide for access to the bottom of the tank.

By my present method and apparatus it is possible to maintain a brine of as high a specific gravity as is practicable and which may be at nearly full saturation.

For the purpose of initially cooling the apparatus, the brine may be circulated continuously through the salt chamber 10, and the ice box 11, the freezing section being empty, and for this purpose a main valve 21ᵃ in the distributing line 22 may be closed and the discharge led upwardly from the stand pipe 21 and through the valved branch 35 having an outlet 36 discharging into the ice chamber 10, the brine being also conveyed through the connection 25 to the salt box 11; see Fig. 7. From this it will be seen that the brine can be raised in specific gravity and at the same time can be lowered in temperature before it is discharged into the freezing section.

For economical operation, the chilled brine may be run into any suitable cold storage chamber when it is not being used in the tank for freezing, and therefore the discharge from the pump may be directed through a pipe 37 having a valve 38 for conducting the chilled brine to a cold room where its low degree of temperature may be maintained and from which it can be promptly transferred to the freezing tank when needed with an obvious saving in cost of brining and cooling when the freezing operation is begun.

In Fig. 7 the freezing compartment or section of the tank is shown as being provided with a reticulated bottom 2ᵃ of any suitable form and which is spaced above the bottom 2 a suitable distance. The distributing pipe 22 is in this form of the invention extended into the tank and somewhat above the bottom 2 and discharges below the false, reticulated bottom 2ᵃ. The jet or jets of refrigerant from the distributor 22 may be broken as by suitable barriers 4ᵃ positioned suitably apart in the space below the false bottom 2ᵃ so that the brine will be diverted upwardly with substantially uniform pressure throughout the false bottom.

It is good practice to provide means for wholly submerging the uppermost of a batch of fish and this is readily accomplished by the application of a pressure screen 41 of any suitable form which may consist of a wooden grill capable of holding down the adjacent submerged fish.

The freezing section of the tank may be drained and the refrigerant stored by closing the valve 21ª, opening the valve in the stand pipe 21 above the valve 21ª, closing the valve in the connection 25, and that in the branch 35, and opening the valve 21ᵇ in the by-pass 21ᶜ, which causes the pump 15 to convey said refrigerant from said freezing section, through the pipe 22, by-pass 21ᶜ, up through the stand pipe 21 and out through the pipe 37 to the storage chamber.

In operation, a suitable quantity of salt is placed in the salt box 11, and the ice chamber or space 10 filled with ice, a few inches of water or refrigerant obtained from the storage chamber having initially been placed in the apparatus.

The pump 15 being placed in operation, a circulation is maintained between the chambers 10 and 11, the valves, as above explained being operated in proper sequence. The apparatus being thus initially cooled, the freezing section is placed in operation and the comestibles to be frozen bodily submerged therein. This results in a raise in temperature of the refrigerant in the freezing section or sections. The pump causing the refrigerant in the freezing section to overflow and that also in the salt box, the two liquids are commingled with the ice, thus lowering the temperature of the removed portion of the refrigerant in the freezing section. The mixture, thus formed, is conveyed to the bottom of the freezing section, causing the comestibles to be agitated about in all directions. More ice is intermittently added, as needed, until the comestibles have been frozen, which may be done in a remarkably short time and with a minimum expenditure of ice and salt.

It is, of course, understood that I do not desire to be limited to the exact details of construction shown and described, and that modifications thereof may be made within the scope of the appended claims.

What is claim is:

1. The process of uniformly cooling and freezing comestibles, whereby they may be shipped to great distances without glazing, consisting of bodily submerging the comestibles in a substantially saturated brine of a temperature close to freezing, thereby raising its temperature, removing said brine from the top, causing the brine, thus removed, to flow over a mass of crushed ice, adding to said removed portion a solution of salt and water, thereby lowering the temperature and raising the specific gravity of the mixture thus formed, and then returning said mixture to said first mentioned brine, from below in the form of jets of substantial velocity, whereby the comestibles may be moved about in all directions so they may be individually frozen and in a uniform manner.

2. In an apparatus for freezing fish the combination of a freezing compartment, an ice compartment and a salt compartment, means for withdrawing liquid from said ice compartment and delivering part to the lower part of said freezing compartment, and part to the lower part of said compartment, means at the top of said salt and freezing compartments permitting liquid to overflow from said compartments into said ice compartment and means in said freezing compartment for holding articles immersed therein below the level of the overflow from said compartment.

3. In an apparatus for freezing fish, a tank divided by partitions into a freezing compartment, an intermediate ice compartment and a salt compartment, a brine pump having its suction side connected with the bottom of said ice compartment and a conduit leading from the delivery side of said pump having one branch leading to the bottom of said salt compartment and another branch connected to a plurality of vertical nozzles located in the bottom of said freezing compartment whereby the forced discharge of liquid through said nozzles will tend to keep the loose fish in said compartment constantly stirred up, means for controlling the flow of liquid through both said delivery conduits, overflow openings at the top of both said partitions and means for adjusting the height of the overflow from said freezing compartment.

4. The process of individually freezing comestibles which consists in bodily submerging the comestibles in an approximately saturated refrigerating solution of a temperature close to freezing, continually removing a portion of said solution from the top, and introducing said solution from below in the form of jets of substantial velocity.

5. The process of individually freezing comestibles which consists in bodily submerging the comestibles in an approximately saturated refrigerating solution of a temperature close to freezing, continually removing a portion of said solution from the top, lowering its temperature and raising its specific gravity, and returning said removed portion below said comestibles in the form of jets of substantial velocity.

6. The process of individually freezing comestibles which consists in bodily submerging the comestibles in a substantially saturated refrigerating solution close to freezing, and causing said comestibles to be agitated in all directions by introducing said solution below said comestibles in the form of jets of substantial velocity and causing said solution to be continually removed from said comestibles.

7. The process of individually freezing comestibles which consists in bodily submerging the comestibles in a substantially saturated refrigerating solution of a temperature close to freezing, continually removing said solution from said comestibles, recooling it and causing said comestibles to be agitated in all directions by returning said removed portion below said comestibles in the form of jets of substantial velocity.

8. The process of freezing comestibles individually which consists in bodily submerging the comestibles in a refrigerant of an approximately freezing temperature, continually removing said refrigerant from said comestibles, lowering its temperature, and raising its specific gravity, and introducing said refrigerant, thus treated, below said comestibles in the form of jets of substantial velocity.

9. In a single tank freezer, in combination, a single tank divided into compartments, one of said compartments being adapted to house a refrigerating material, another of said compartments being adapted to house a refrigerating medium, still another of said compartments being adapted to house a substantially saturated refrigerating solution, said last mentioned compartment being also adapted to house the comestibles to be frozen, and means associated with said compartments whereby a circulation is maintained therebetween and said comestibles agitated in all directions by jets of substantial velocity.

10. In a single tank freezer, in combination, a tank adapted to house a refrigerant and the comestibles to be frozen, means associated with said tank whereby a circulation is maintained in said tank, and means associated with said last mentioned means whereby said comestibles are agitated in all directions by the introduction thereunder of jets of refrigerant of substantial velocity.

11. In a single tank freezer, in combination, a tank divided into compartments, one of said tanks being adapted to house a refrigerant and the comestibles to be frozen, the other of said compartments adapted to house materials for lowering the temperature and raising the specific gravity of said refrigerant, means associated with said tank and said compartments whereby a circulation may be maintained therebetween, said tank and said compartments being provided with means for rendering said circulation effective, and means whereby jets of cooled refrigerant may agitate said comestibles in all directions.

12. In an apparatus of the class described, in combination, a single tank adapted to house a refrigerant and the comestibles to be frozen, means associated with said tank for submerging said comestibles in said refrigerant, said tank being provided with means whereby said refrigerant is continually removed from said comestibles, said tank being also provided with means whereby said removed refrigerant is recooled and its specific gravity raised, means for rendering both of said means operative, and means, rendered operative by said last mentioned means, whereby jets of said removed refrigerant may agitate said comestibles in all directions.

13. In a refrigerating apparatus, in combination, a tank, one or more freezing sections in said tank, said sections adapted to contain a refrigerant, means for holding submerged the comestibles in said sections, one or more salt compartments in said tank, said freezing sections and said salt compartments being spaced apart to form an ice compartment, and means for causing a circulation to be maintained in said tank and between said compartments so that the comestibles may be individually and uniformly frozen.

14. In a refrigerating apparatus, in combination, a tank, one or more freezing sections in said tank adapted to house a refrigerant, means for holding submerged the comestibles in said sections, one or more salt compartments in said tank, said salt compartments and said freezing sections being spaced apart to provide an ice compartment, said sections and said compartments being each formed with overflow means, and means associated with said tank whereby a circulation may be maintained in said tank and between said compartments for individually freezing said comestibles.

15. In a refrigerating apparatus, in combination, a tank, one or more freezing sections in said tank for housing a refrigerant, means for holding submerged the comestibles in said sections, one or more salt compartments in said tank, said compartments being spaced apart to provide an ice compartment, all of said compartments being formed with overflow means, and means whereby a circulation may be maintained in said tank and between said compartments so that said refrigerant may be renewed and returned to said sections to freeze said comestibles individually and uniformly.

16. In a refrigerating apparatus, in combination, a tank, one or more freezing sections in said tank for housing a refrigerant, one or more salt compartments in said tank, said compartments being spaced apart to provide an ice compartment, a pump mounted outside and in close proximity with said tank, a pipe line connecting said compartments and said pump, a pipe line connecting said ice compartment and said pump, and a pipe line connecting said sections with said pump, said compartments being provided with overflow means, said pump being adapted to cause a circulation in said tank and said compartments for individually and uniformly freezing comestibles.

17. In a refrigerating apparatus, in combination, a tank, one or more freezing sections in said tank for housing a refrigerant, means for holding submerged the comestibles in said sections, one or more salt compartments in said tank, one or more ice compartments in said tank, and means for causing a circulation therebetween, said compartments being so constructed that said circulation will be effective to renew the refrigerant in said sections and cause said comestibles to be uniformly and individually frozen.

18. In a refrigerating apparatus, in combination, a tank, one or more freezing sections for housing a refrigerant and the comestibles to be frozen, one or more compartments in said tank for housing a material for raising the specific gravity of said refrigerant, a pump mounted outside and in close proximity with said tank, said tank being provided with means for establishing communication between said compartments, pipe lines between said pump and said tank, said pump being adapted to cause a circulation to be maintained between said sections and said compartments, whereby the temperature of said refrigerant in said sections may be continually maintained close to freezing, and means in said pipe lines for regulating said circulation.

19. In combination, a tank, means for closing said tank, at least two compartments in said tank adapted to contain a substantially saturated refrigerating solution, one of said compartments adapted to contain also a mass of crushed ice, means for holding submerged comestibles directly in said solution, said compartments being formed with overflow means, circulating means associated with said tank and said compartments for freezing said comestibles, and means for regulating the level of the solution in one of said compartments.

20. In a refrigerating apparatus, in combination, a tank, a freezing section therein for housing a refrigerant, means adapted to hold submerged the comestibles to be frozen directly in said refrigerant, said container being equipped with means adapted to hold materials whereby the specific gravity of said refrigerant may be raised and its temperature lowered, means adapted to cause a circulation in said tank and through said freezing section, and means in said section adapted to divert upwardly the refrigerant circulated, in order that the lower portion of said refrigerant will be subjected to a uniform pressure throughout so that the comestibles may be agitated in all directions for individually and uniformly freezing the same.

21. In a refrigerating apparatus, in combination, a container adapted to house a refrigerant and materials for maintaining the same in an approximately saturated condition and at a temperature close to freezing, means associated with said container for causing a circulation to be maintained between said refrigerant and said materials, and means associated with said circulation means for draining said container.

22. In a refrigerating apparatus, in combination, a container adapted to house a refrigerant and materials for maintaining the same in an approximately saturated condition and at a temperature close to freezing, means associated with said container for causing a circulation to be maintained between said refrigerant and said materials, said circulation means having a branch connection leading to said tank, a branch connection leading to a drain, a by-pass connection between the intake and discharge connections of said circulation means, and valves in said connections whereby said valves may be manipulated in a proper combination to optionally drain the container through said circulation means without reversing the flow of the latter.

In testimony whereof I have signed my name to this specification.

JOHN W. NEWTON.